United States Patent
Kurokawa

(10) Patent No.: US 9,758,196 B2
(45) Date of Patent: Sep. 12, 2017

(54) VEHICLE FRAMEWORK REINFORCEMENT STRUCTURE

(71) Applicant: Toyota Jidosha Kabushiki Kaisha, Toyota-shi Aichi-ken (JP)

(72) Inventor: Hiroyuki Kurokawa, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/223,097

(22) Filed: Jul. 29, 2016

(65) Prior Publication Data

US 2017/0029039 A1 Feb. 2, 2017

(30) Foreign Application Priority Data

Jul. 31, 2015 (JP) ................................. 2015-152452

(51) Int. Cl.
  *B62D 25/08* (2006.01)
  *B62D 27/02* (2006.01)
  *B62D 29/00* (2006.01)

(52) U.S. Cl.
  CPC ......... *B62D 27/023* (2013.01); *B62D 25/082* (2013.01); *B62D 29/008* (2013.01)

(58) Field of Classification Search
  CPC .. B62D 25/08; B62D 25/2018; B62D 25/082; B62D 27/023; B62D 27/02; B62D 29/005; B62D 29/008
  See application file for complete search history.

(56) References Cited

U.S. PATENT DOCUMENTS

| 2,113,403 | A | * | 4/1938 | Harmon | B62D 21/02 182/228.1 |
| 6,434,907 | B1 | * | 8/2002 | Simboli | B62D 21/09 296/146.6 |
| 2002/0070572 | A1 | * | 6/2002 | Stol | B62D 23/005 296/29 |
| 2016/0068193 | A1 | * | 3/2016 | Koike | B62D 25/2045 296/187.09 |
| 2016/0251037 | A1 | * | 9/2016 | Delord | B62D 27/023 |
| 2017/0029039 | A1 | * | 2/2017 | Kurokawa | B62D 27/023 |
| 2017/0158244 | A1 | * | 6/2017 | Bach | B62D 25/02 |

FOREIGN PATENT DOCUMENTS

JP H10-338161 A 12/1998

* cited by examiner

*Primary Examiner* — Gregory Blankenship
(74) *Attorney, Agent, or Firm* — Dinsmore & Shohl LLP

(57) ABSTRACT

A vehicle framework reinforcement structure includes: a joining member in a tubular shape with a bottom that is mounted to a vehicle main body, including a floor wall that includes plural slit portions; a vehicle framework member that is inserted into the joining member, an outer wall face of the vehicle framework member being welded to an opening end portion of the joining member, and the vehicle framework member being configured such that portions of an end face thereof are exposed through the slit portions; plural projection portions formed along the plural slit portions, the projection portions contacting an inner wall face of the vehicle framework member; and plural weld portions, the portions of the end face of the vehicle framework member that are exposed through the slit portions being welded to the joining member at the weld portions, and the weld portions including welding of the projection portions.

8 Claims, 8 Drawing Sheets

VEHICLE FRAMEWORK REINFORCEMENT STRUCTURE

CROSS-REFERENCE TO RELATED APPLICATION

This application is based on and claims priority under 35 USC 119 from Japanese Patent Application No. 2015-152452 filed on Jul. 31, 2015, the disclosure of which is incorporated by reference herein.

BACKGROUND

Technical Field

The present disclosure relates to a vehicle framework reinforcement structure.

Related Art

A joint portion structure of a frame of a vehicle has been known since heretofore (for example, see Japanese Patent Application Laid-Open (JP-A) No. H10-338161) in which a brace with a bisected horn shape is provided for welding a cross-member to an inner wall of a side member.

However, when a vehicle framework member such as a cross-member, a side member or the like is welded to a joining member that is mounted to a vehicle main body, if a weld region is small, it is difficult to assure rigidity of the vehicle framework member.

SUMMARY

The present disclosure provides a vehicle framework reinforcement structure that may effectively increase a weld region of a vehicle framework member to a joining member that is mounted to a vehicle main body.

One aspect of the present disclosure is a vehicle framework reinforcement structure including: a joining member in a tubular shape with a bottom that is mounted to a vehicle main body, the joining member including a floor wall that includes plural slit portions; a vehicle framework member that is inserted into the joining member, an outer wall face of the vehicle framework member being welded to an opening end portion of the joining member, and the vehicle framework member being configured such that portions of an end face thereof are exposed through the plural slit portions; plural projection portions formed along the plural slit portions, the projection portions contacting an inner wall face of the vehicle framework member; and plural weld portions, the portions of the end face of the vehicle framework member that are exposed through the slit portions being welded to the joining member at the weld portions, and the weld portions including welding of the projection portions.

According to the aspect described above, the outer wall face of the vehicle framework member is welded to the opening end portion of the joining member, and the portion of the end face of the vehicle framework member that is exposed through each slit portion provided in the floor wall of the joining member is welded to the joining member, including the projection portion formed at the floor wall of the joining member. Therefore, a weld region of the vehicle framework member to the joining member that is mounted to the vehicle main body is effectively increased.

In the above aspect, the projection portions may include inclined faces that are angled toward outer sides from the floor wall, and the weld portions may include welding of the inclined faces.

According to the structure described above, the welding of the portion of the end face of the vehicle framework member that is exposed through each slit portion provided in the floor wall of the joining member to the joining member includes welding of the inclined face of the projection portion that is formed at the floor wall of the joining member. Thus, a weld area of the vehicle framework member to the joining member is increased. That is, the weld region of the vehicle framework member to the joining member is more effectively increased.

In the above aspect, the weld portions may include welding of the inner wall face of the vehicle framework member.

According to the structure described above, the welding of the portion of the end face of the vehicle framework member that is exposed through each slit portion provided in the floor wall of the joining member to the joining member includes welding of both (the inclined face of) the projection portion that is formed at the floor wall of the joining member and the inner wall face of the vehicle framework member. Thus, the weld area of the vehicle framework member to the joining member is increased. That is, the weld region of the vehicle framework member to the joining member is more effectively increased.

In the above aspect, edge portions of the slit portions that oppose the projection portions may include chamfer portions, and the weld portions may include welding of the chamfer portions.

According to the structure described above, the welding of the portion of the end face of the vehicle framework member that is exposed through each slit portion provided in the floor wall of the joining member to the joining member includes welding of both (the inclined face of) the projection portion that is formed at the floor wall of the joining member and the chamfer portion. Thus, the weld area of the vehicle framework member to the joining member is increased. That is, the weld region of the vehicle framework member to the joining member is more effectively increased.

In the above aspect, the weld portions may include welding of the outer wall face of the vehicle framework member.

According to the structure described above, the welding of the portion of the end face of the vehicle framework member that is exposed through each slit portion provided in the floor wall of the joining member to the joining member includes welding of (the inclined face of) the projection portion that is formed at the floor wall of the joining member, the chamfer portion, and the outer wall face of the vehicle framework member. Thus, the weld area of the vehicle framework member to the joining member is increased. That is, the weld region of the vehicle framework member to the joining member is more effectively increased.

In the above aspect, the vehicle framework member may be formed in a rectangular shape in cross section, and the plural slit portions may expose the end face at least at corner portions of the vehicle framework member.

According to the structure described above, the slit portions expose the end face at least at the corner portions of the vehicle framework member that is formed in the rectangular shape in cross section. That is, the corner portions of the vehicle framework member are welded to the joining member. Therefore, a welding strength of the vehicle framework member to the joining member is improved and rigidity of the vehicle framework member is improved.

BRIEF DESCRIPTION OF THE DRAWINGS

Exemplary embodiments of the present disclosure will be described in detail based on the following figures, wherein.

DETAILED DESCRIPTION

Figure 1:
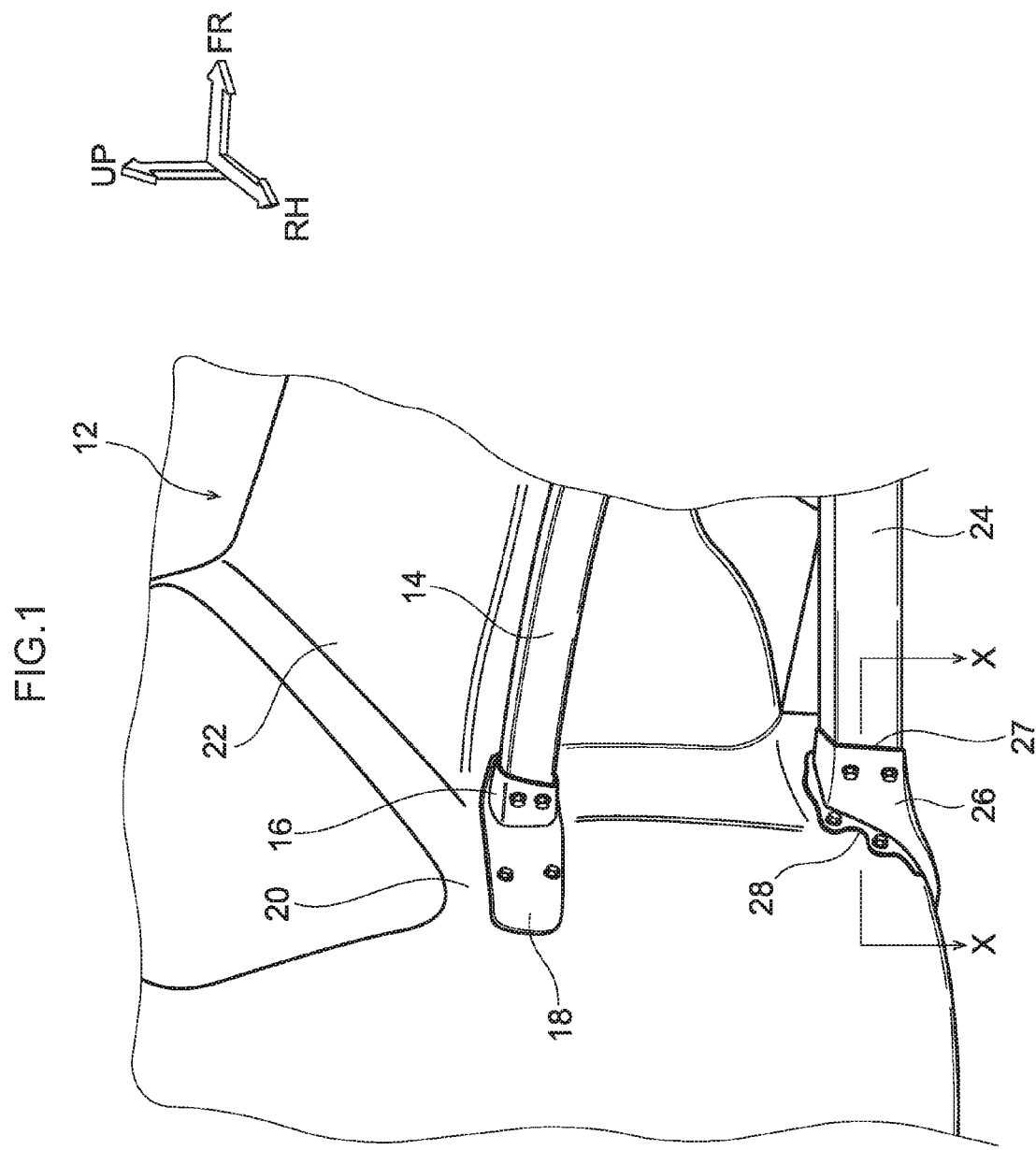
FIG. 1 is a perspective view illustrating a portion of a vehicle equipped with a vehicle framework reinforcement structure in accordance with present exemplary embodiments.

Herebelow, exemplary embodiments are described in detail in accordance with the drawings. For convenience of description, the arrow UP that is illustrated in the drawings indicates a vehicle upper direction, the arrow FR indicates a vehicle front direction, and the arrow RH indicates a vehicle right direction. In the following descriptions, where the directions front, rear, up, down, left and right are recited without being particularly specified, the same represent the front and rear in the vehicle front-and-rear direction, up and down in the vehicle up-and-down direction, and left and right in the vehicle left-and-right direction (the vehicle width direction).

First Exemplary Embodiment

First, a vehicle framework reinforcement structure 10 according to a first exemplary embodiment is described. The vehicle framework reinforcement structure 10 according to the present exemplary embodiment may be employed at a front portion side and a rear portion side of a vehicle 12, and also at side portion sides. Herein, the front portion side of the vehicle 12 is taken as an example and described.

As illustrated in FIG. 1, a pair of left and right upper members 14 are disposed at the front portion side of the vehicle 12. Each upper member 14 extends in the vehicle front-and-rear direction. The upper member 14 is formed with a constant cross section in a rectangular closed cross section shape (a hollow shape) by extrusion molding of a lightweight metal material such as an aluminum alloy or the like.

A respective cap member 16 is attached to a rear end portion of each upper member 14. An outer flange portion 18 extends to the vehicle width direction outer side of the cap member 16. The outer flange portions 18 are mounted by bolt-fastening to respective vehicle width direction outer side upper end portions of a front panel 20 that serves as a vehicle main body. The front panel 20 structures a front wall of a vehicle cabin.

A vehicle width direction inner side region of the front panel 20 integrally protrudes to the vehicle forward side and structures a cowl 22 that is a portion of the vehicle body. The front panel 20 is fabricated of resin, being formed of, for example, a carbon fiber reinforced resin material (CFRP). The carbon fibers are oriented in the horizontal direction, thus forming a structure in which a tensile strength of the front panel 20 in the horizontal direction is improved.

A pair of left and right front side members 24 that serve as vehicle framework members extending in the vehicle front-and-rear direction are disposed at the vehicle lower sides of the upper members 14. Each front side member 24 is formed with a constant cross section in a rectangular closed cross section shape (a hollow shape) by extrusion molding of a lightweight metal material such as an aluminum alloy or the like.

Figure 2:
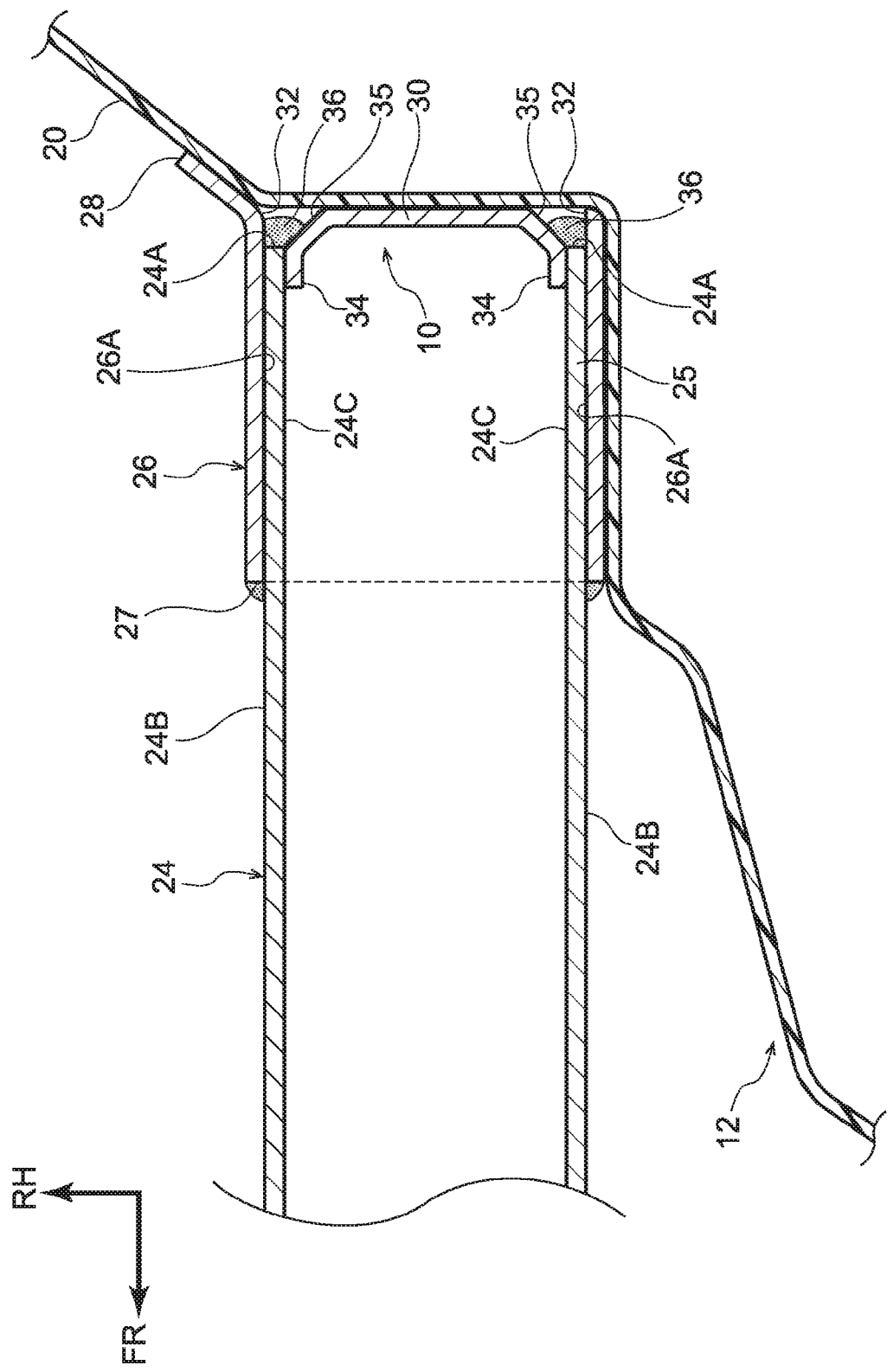
FIG. 2 is a sectional diagram viewed along arrows X-X of FIG. 1.

As illustrated in FIG. 1 and FIG. 2, a cap member 26 that serves as a joining member is attached to a rear end portion 25 of each front side member 24. An outer flange portion 28 extends to the vehicle width direction outer side of the cap member 26. Each outer flange portion 28 is mounted to the front panel 20 by bolt-fastening. Bolts and the like of the respective bolt fastenings are not illustrated in FIG. 2 and subsequent drawings.

Each cap member 26 is formed in a square tube shape with a bottom by die-casting of a lightweight metal material such as an aluminum alloy or the like. That is, the cap member 26 includes an outer wall, an upper wall, an inner wall, a lower wall and a floor wall 30. Accordingly, the cap member 26 covers an outer wall, upper wall, inner wall and lower wall of the front side member 24 from respective outer sides thereof. In addition, an opening at the side of the front side member 24 at which the rear end portion 25 is disposed is closed off by the floor wall 30.

Now, a joining structure between each front side member 24 and cap member 26 is described. The rear end portion 25 of the front side member 24 is inserted inside the cap member 26 from the vehicle forward side thereof In other words, the cap member 26 is fitted to the outer side of the rear end portion 25 from the vehicle rearward side.

An opening end portion 27 is formed by front end portions of the outer wall, upper wall, inner wall and lower wall of the cap member 26. An end face 24A is formed at the rear end portion 25, at the insertion direction side of the front side member 24. The opening end portion 27 is joined by arc welding over the whole periphery thereof to an outer face (outer wall face) 24B of the outer wall, upper wall, inner wall and lower wall of the front side member 24. In addition, portions of the end face 24A are joined to the cap member 26 by arc welding.

Figure 3:
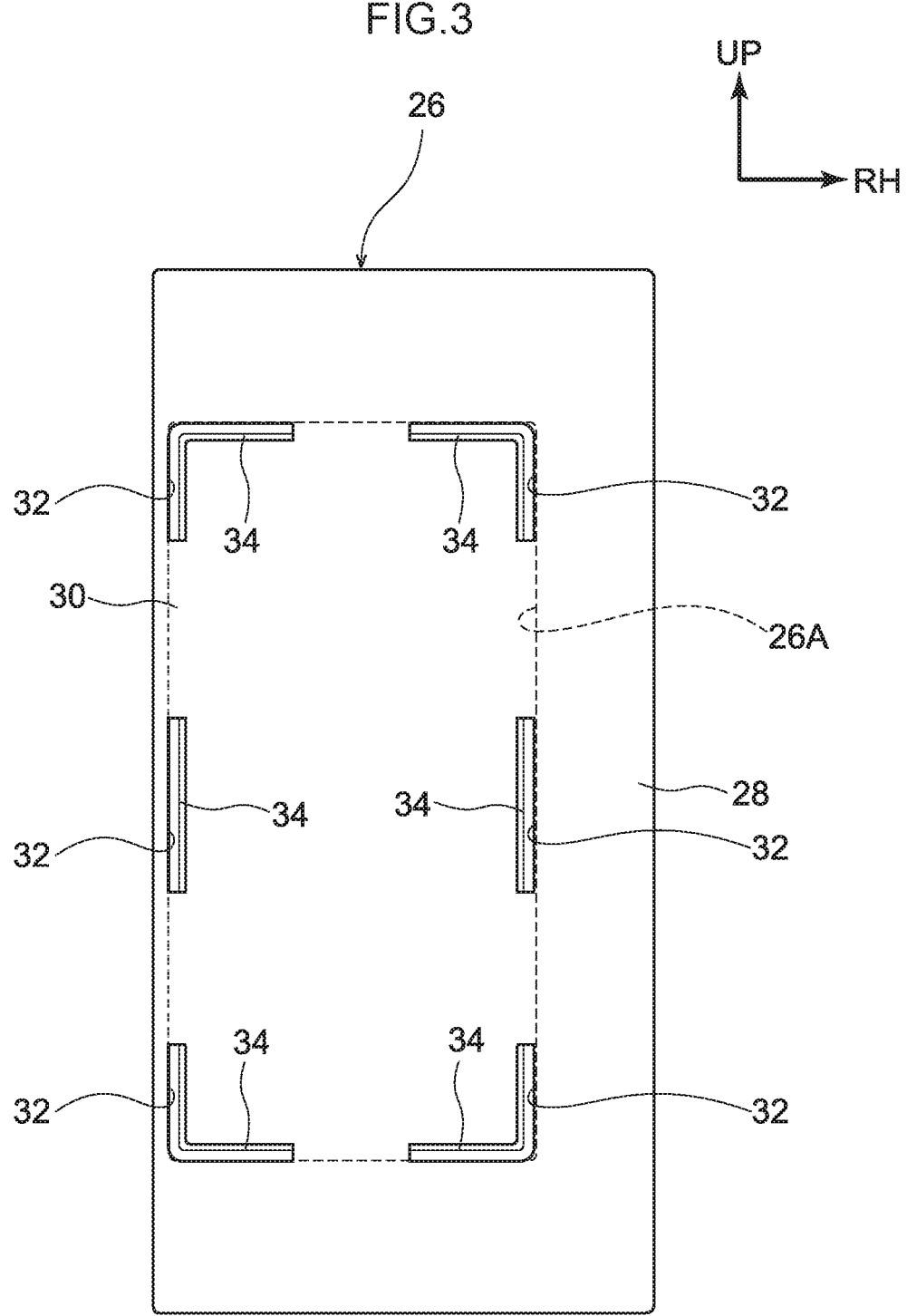
FIG. 3 is a rear view illustrating a floor wall of a joining member that structures the vehicle framework reinforcement structure in accordance with the present exemplary embodiments.

To describe this in more detail, as illustrated in FIG. 2 and FIG. 3, slit portions 32 are plurally formed in portions of the floor wall 30 that oppose the end face 24A of the rear end portion 25 of the front side member 24 in the vehicle front-and-rear direction (the length direction of the front side member 24). Each slit portion 32 exposes a portion of the end face 24A of the front side member 24.

The slit portions 32 are formed so as to expose the end face 24A at least at corner portions (ridgeline portions) of the front side member 24 that is formed in a rectangular cross section shape. Each slit portion 32 corresponding with a corner portion of the front side member 24 is formed in a substantial "L" shape in a rear view as seen from the vehicle rear side (see FIG. 3).

A height in the up-and-down direction of the front side member 24 according to the present exemplary embodiment is large. Accordingly, linear slit portions 32 that extend in the up-and-down direction are formed at up-and-down direction middle portions at both left and right sides of the floor wall 30. That is, the slit portions 32 may be increased in number as appropriate to suit the size of the front side member 24.

As illustrated in FIG. 2 to FIG. 5, projection portions 34 are integrally formed at the floor wall 30 along edge portions at the inner sides of the slit portions 32. The projection portions 34 protrude to the vehicle forward side (in the length direction of the front side member 24). Each projection portion 34 is formed in a flat plate shape of which a flat surface touches against an inner face (inner wall face) 24C of the outer wall, upper wall, inner wall and lower wall of the front side member 24 in the state in which the front side member 24 is inserted into the cap member 26 (that is, the projection portion 34 at each corner portion is formed in a flat plate shape with a substantial "L" shape in cross section).

The inner face 24C and outer face 24B of the rear end portion 25 of the front side member 24 touch against, respectively, outer faces 34A of the projection portions 34 and an inner face 26A of the cap member 26, with the rear end portion 25 being inserted between the outer faces 34A and the inner face 26A. Accordingly, gaps between the outer faces 34A of the projection portions 34 and the inner face 26A of the cap member 26 are substantially the same size as a plate thickness of the front side member 24.

Figure 4:
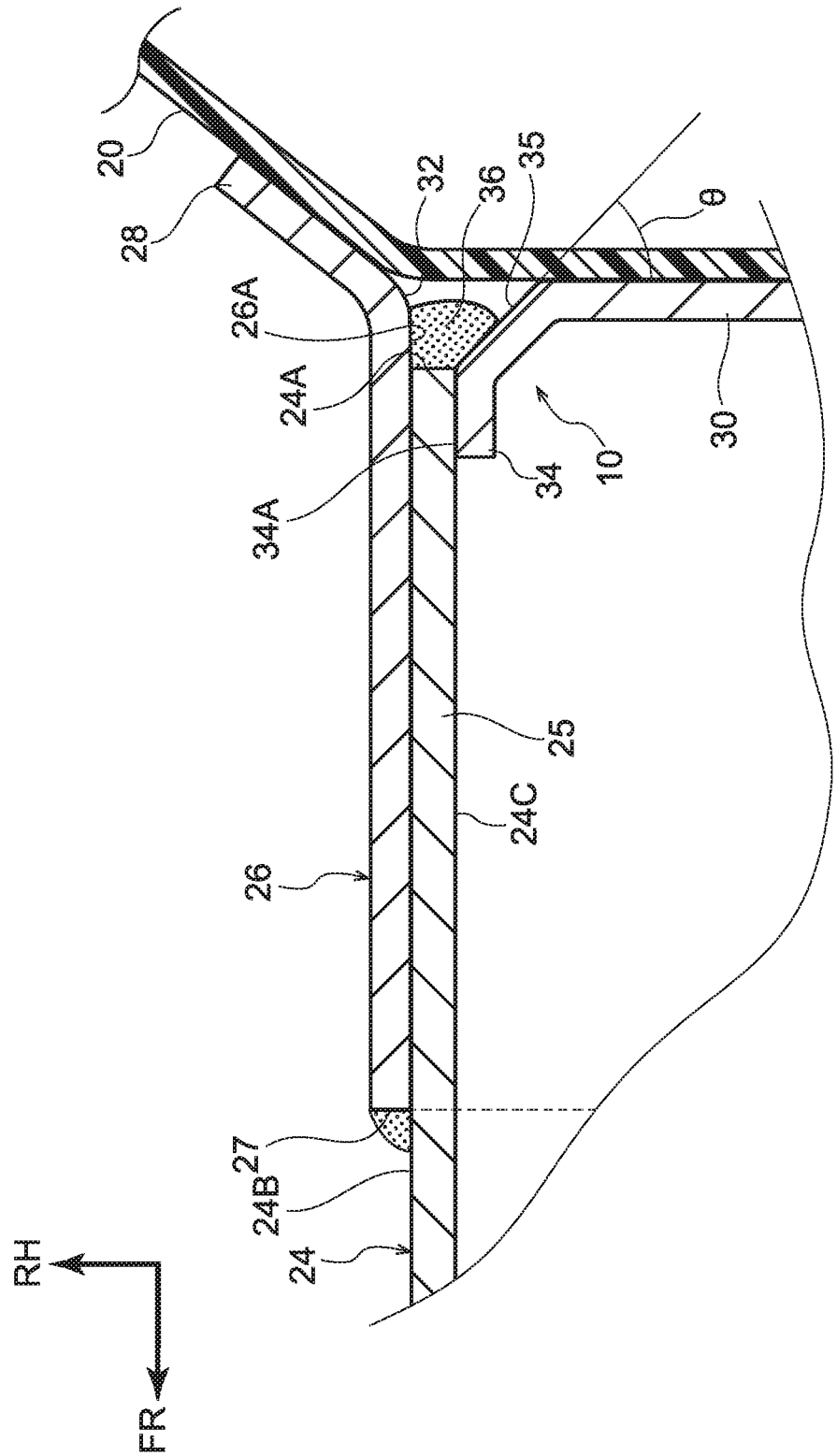
FIG. 4 is a magnified sectional diagram of a portion of FIG. 2, illustrating a vehicle framework reinforcement structure in accordance with a first exemplary embodiment.
Figure 5:
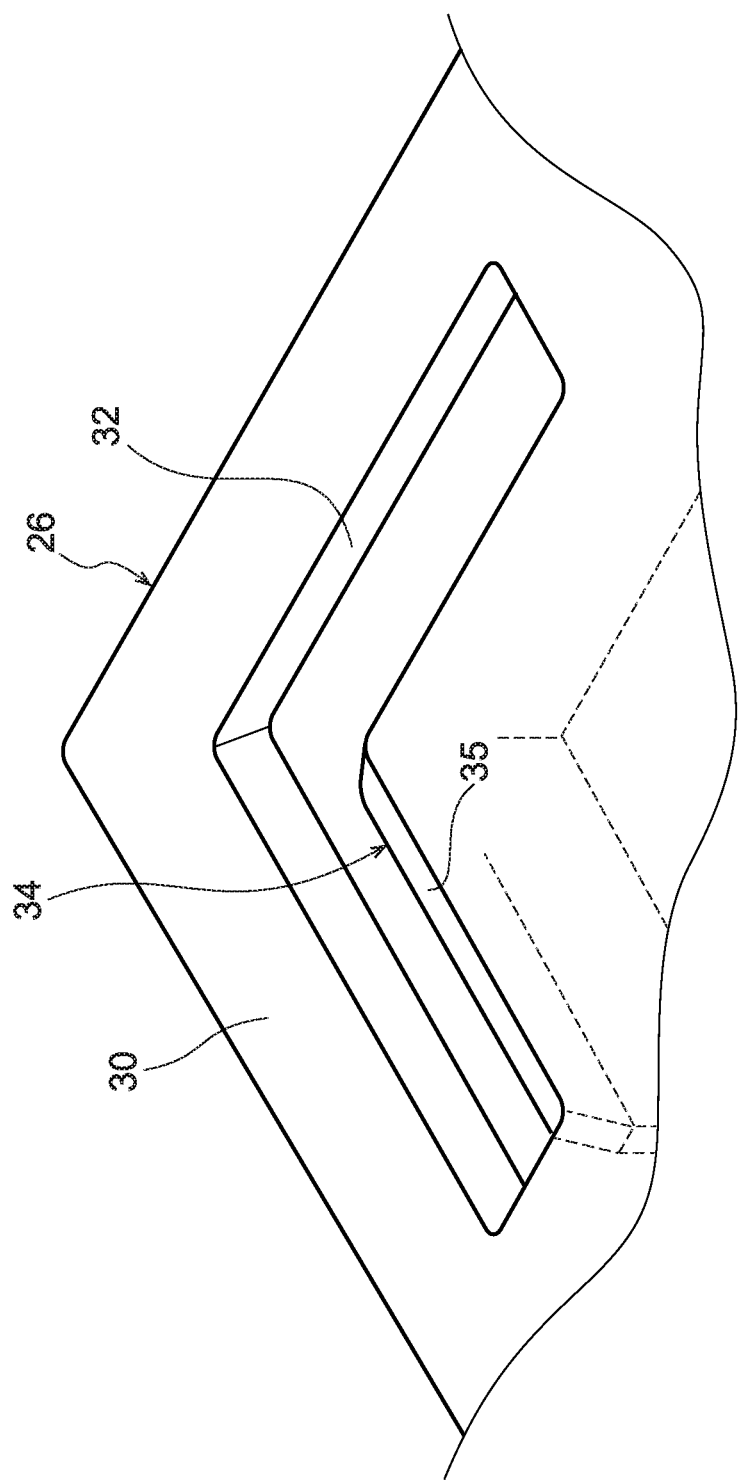
FIG. 5 is a perspective view illustrating a magnification of a slit portion formed in the floor wall of the joining member structuring the vehicle framework reinforcement structure in accordance with the first exemplary embodiment.

As illustrated in FIG. 4 and FIG. 5, each projection portion 34 includes an inclined face 35 that is angled toward the outer side from the floor wall 30. That is, the projection portion 34 is structured such that the outer face 34A makes surface contact with the inner face 24C of the rear end portion 25 of the front side member 24 at the front side (the protrusion direction side) relative to the inclined face 35. An inclination angle $\theta$ of the inclined face 35 of the projection portion 34 relative to the floor wall 30 is set to 45°.

As illustrated in FIG. 4, portions of the end face 24A of the front side member 24 that are exposed through the slit portions 32 and portions of the inner face 26A of the outer wall, upper wall, inner wall and lower wall of the cap member 26 are joined together by arc welding, including welding of the inclined face 35 of each projection portion 34 formed at the cap member 26.

The plural weld regions formed in the slit portions 32 serve as weld portions 36. Thus, a weld region between the front side member 24 and the cap member 26 that has been just welding of the outer face 24B to the opening end portion 27 of the cap member 26 is increased by an amount corresponding to the number of the weld portions 36.

Now, operations of the vehicle framework reinforcement structure 10 according to the first exemplary embodiment structured as described above are described.

As described above, the opening end portion 27 of the outer wall, upper wall, inner wall and lower wall of the cap member 26 is joined by arc welding over the whole periphery to the outer face 24B of the outer wall, upper wall, inner wall and lower wall of the front side member 24, in addition to which portions of the end face 24A of the rear end portion 25 of the front side member 24 are joined by arc welding to the floor wall 30 of the cap member 26.

To describe this in more detail, the portions of the end face 24A of the front side member 24 that are exposed through the plural slit portions 32 provided at the floor wall 30 are joined by arc welding to portions of the outer wall, upper wall, inner wall and lower wall of the cap member 26 and to the inclined faces 35 of the projection portions 34. Thus, the plural weld portions 36 are formed.

Therefore, a weld region (a weld area) of the front side member 24 to the cap member 26 may be effectively increased, and a welding strength between the front side member 24 and the cap member 26 may be improved. Consequently, a joining strength of each front side member 24 to the front panel 20 via the cap member 26 may be increased, and reliability of these joins may be improved.

In particular, because the end face 24A is welded to the cap member 26, including the projection portion 34 (the inclined face 35), at each corner portion constituting a ridgeline portion of the front side member 24, the welding strength between the front side member 24 and the cap member 26 may be improved (the front side member 24 may be more securely joined to the cap member 26) compared to a structure in which the end face 24A is not welded to the cap member 26 at each corner portion. Consequently, rigidity of the front side member 24 may be improved.

Moreover, because the inclination angle $\theta$ of the inclined face 35 of each projection portion 34 with respect to the floor wall 30 is set to 45°, compared to a structure in which the inclination angle $\theta$ is not set to 45°, strength of the front side member 24 with respect to loads inputted from the up-and-down direction and the left-and-right direction may be improved by the projection portions 34. There is also an advantage in that when the inclination angle $\theta$ of the inclined face 35 of each projection portion 34 with respect to the floor wall 30 is set to 45°, working efficiency during welding is improved compared to a structure in which the inclination angle $\theta$ is not set to 45°.

As a result of the weld region of each front side member 24 to the cap member 26 being increased (the plural weld portions 36 are formed), stresses caused by loads inputted to the front side member 24 from the suspension (not illustrated in the drawings) during running of the vehicle 12, stresses caused by loads inputted to the front side member 24 during a collision of the vehicle 12, and suchlike may be dispersed toward the side of the cap member 26 at which the floor wall 30 is provided.

That is, in a structure in which the front side member 24 and the cap member 26 are welded only at the side at which the opening end portion 27 is provided, stresses caused by the loads mentioned above would concentrate at the side at which the opening end portion 27 is provided. By contrast, in the present exemplary embodiment stresses caused by the loads mentioned above may be dispersed by the plural weld portions 36 toward the side at which the floor wall 30 is provided. Therefore, concentrations of stress at the side at which the opening end portion 27 is provided may be moderated. In consequence, endurance strength (durable life) and rigidity of the front side member 24, which contribute to collision safety performance, control stability performance and the like of the vehicle 12, may be improved.

In a structure in which the front side member 24 and the cap member 26 are formed of an aluminum alloy, there is concern that strength may be reduced by softening of the front side member 24 and the cap member 26 in the vicinity of weld regions (the weld portions 36) that are subjected to high temperatures. However, in the present exemplary embodiment as described above, concentrations of stress are more greatly dispersed when loads are inputted to the front side member 24. Therefore, a reduction in strength of the front side member 24 and cap member 26 may be suppressed.

In the present exemplary embodiment, the cap member 26 is formed to cover the rear end portion 25 of the front side member 24 from the outer sides thereof, and the cap member 26 is fitted onto the rear end portion 25. Therefore, strength and rigidity of the rear end portion 25 of the front side member 24 may be improved compared to a structure in which the cap member 26 is not fitted onto the rear end portion 25 of the front side member 24 from the outer sides thereof.

In particular, the front side member 24 is formed by extrusion molding of a lightweight metal material and the cap member 26 is formed by die-casting of a lightweight metal material. Thus, the cap member 26 formed by die-casting has lower ductility than the front side member 24 formed by extrusion molding. Therefore, the strength and rigidity of the rear end portion 25 of the front side member 24 may be improved further by the cap member 26.

In the present exemplary embodiment, the projection portions 34 that touch against the inner face 24C of the front side member 24 are plurally formed at the floor wall 30 of the cap member 26, and the weld region of the front side member 24 to the cap member 26 is increased (the plural weld portions 36 are formed). Therefore, a separate reinforcement member or the like for increasing the weld region is unnecessary. As a result, the vehicle 12 may be reduced in weight and a reduction in fuel efficiency may be suppressed or prevented.

Second Exemplary Embodiment

Now, the vehicle framework reinforcement structure 10 according to a second exemplary embodiment is described. Portions that are similar to the above-described first exemplary embodiment are assigned the same reference numerals and are not described in detail (including operations that are similar).

Figure 6:
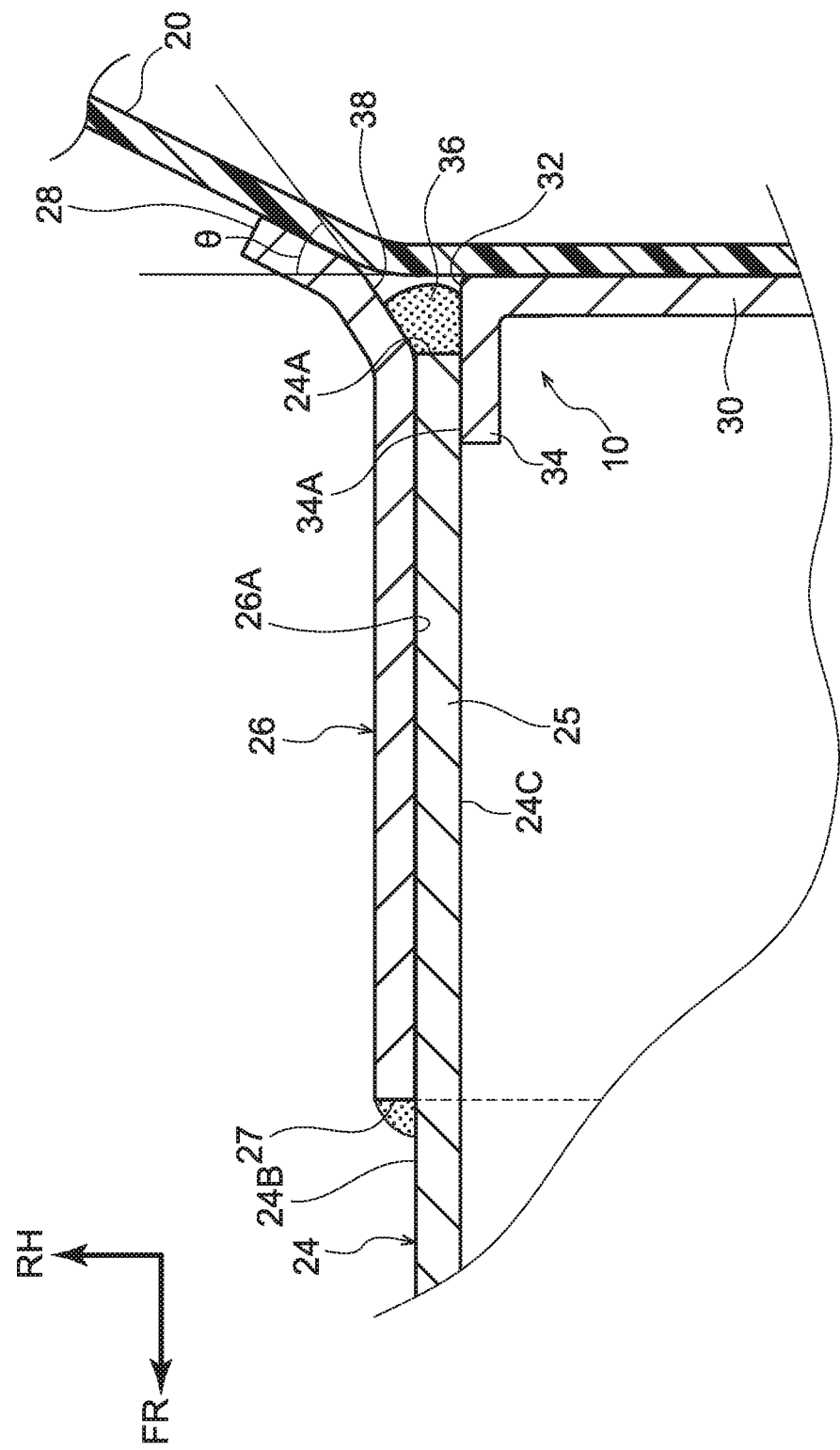
FIG. 6 is a partial magnified sectional diagram corresponding to FIG. 4, illustrating a vehicle framework reinforcement structure in accordance with a second exemplary embodiment.

As illustrated in FIG. 6, in the second exemplary embodiment, the inclined face 35 is not formed at each projection portion 34 but a chamfer portion 38 with an inclined surface shape is formed at an outer side edge portion of the slit portion 32 that opposes the projection portion 34 (i.e., at the inner face 26A of the cap member 26). An inclination angle θ of the chamfer portion 38 with respect to the floor wall 30 is again set to 45°.

The portions of the end face 24A of the front side member 24 that are exposed through the slit portions 32, the chamfer portions 38 formed at the inner face 26A at the outer wall, upper wall, inner wall and lower wall of the cap member 26, and the projection portions 34 (the outer faces 34A thereof) formed at the cap member 26 are joined together by arc welding, and these weld regions serve as the weld portions 36. Therefore, in the vehicle framework reinforcement structure 10 according to the second exemplary embodiment, the same operational effects as in the above-described first exemplary embodiment are provided.

Third Exemplary Embodiment

Now, the vehicle framework reinforcement structure 10 according to a third exemplary embodiment is described. Portions that are similar to the above-described first exemplary embodiment and second exemplary embodiment are assigned the same reference numerals and are not described in detail (including operations that are similar).

Figure 7:
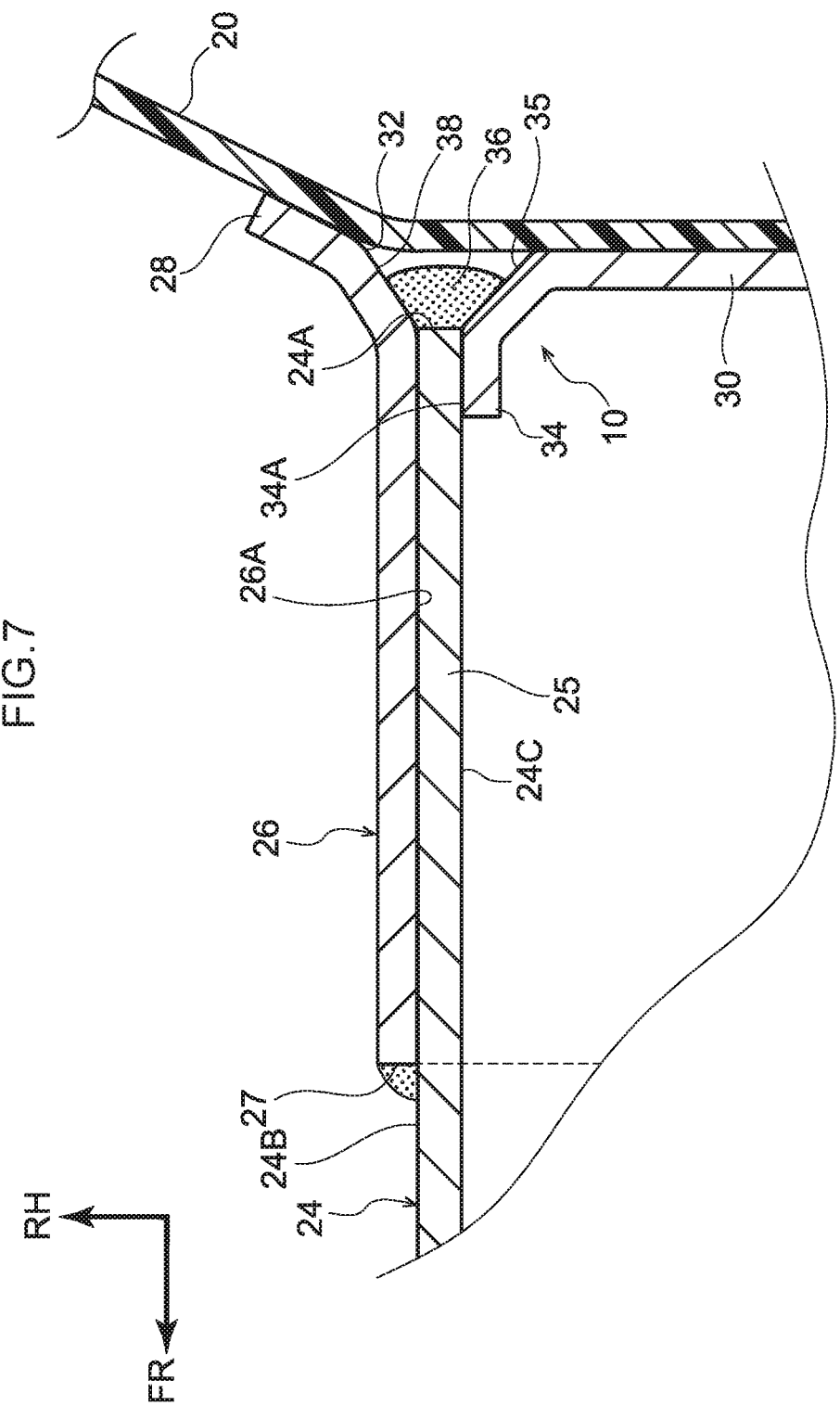
FIG. 7 is a partial magnified sectional diagram corresponding to FIG. 4, illustrating a vehicle framework reinforcement structure in accordance with a third exemplary embodiment.

As illustrated in FIG. 7, the third exemplary embodiment is structured in a form that combines the above-described first exemplary embodiment and second exemplary embodiment. That is, the inclined face 35 is formed at each projection portion 34, and the chamfer portion 38 with the inclined surface shape is formed at the outer side edge portion of the slit portion 32 (the inner face 26A of the cap member 26) opposing the projection portion 34.

The portions of the end face 24A of the front side member 24 that are exposed through the slit portions 32, the chamfer portions 38 formed at the inner face 26A at the outer wall, upper wall, inner wall and lower wall of the cap member 26, and the inclined faces 35 of the projection portions 34 formed at the cap member 26 are joined together by arc welding, and these weld regions serve as the weld portions 36.

In this third exemplary embodiment, the weld area may be increased more than in the above-described first exemplary embodiment and second exemplary embodiment. Therefore, the welding strength between the front side member 24 and the cap member 26 may be improved relative to the above-described first exemplary embodiment and second exemplary embodiment.

Fourth Exemplary Embodiment

Lastly, the vehicle framework reinforcement structure 10 according to a fourth exemplary embodiment is described. Portions that are similar to the above-described first to third exemplary embodiments are assigned the same reference numerals and are not described in detail (including operations that are similar).

Figure 8A:
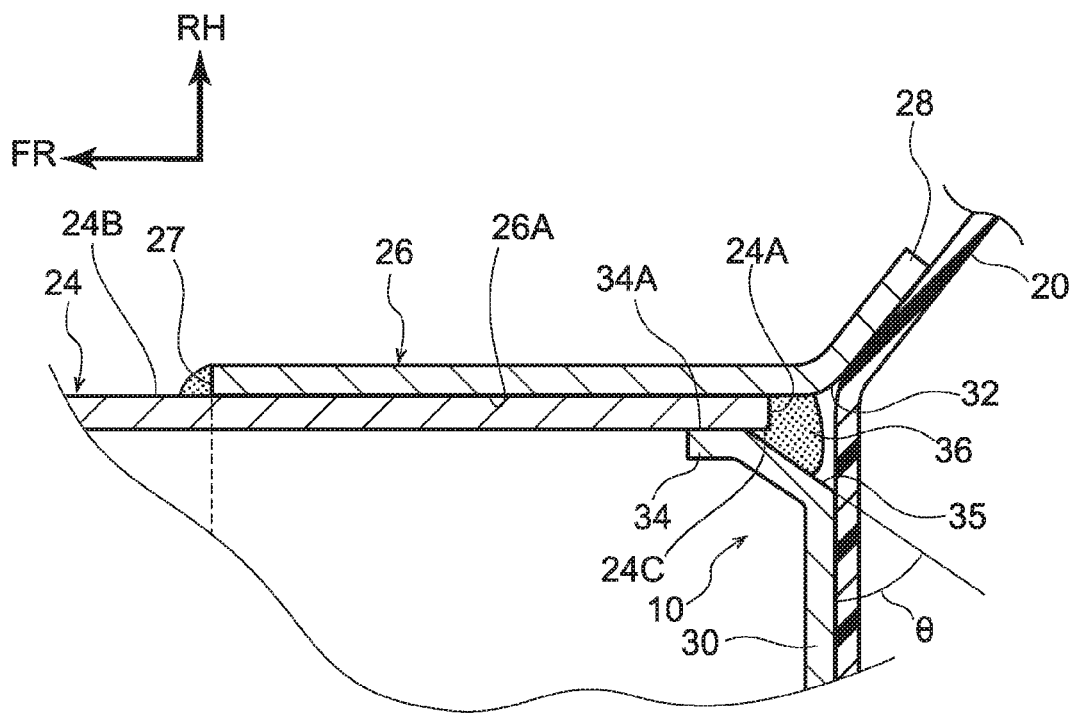
FIG. 8A is a partial magnified sectional diagram corresponding to FIG. 4, illustrating a vehicle framework reinforcement structure in accordance with a fourth exemplary embodiment.

As illustrated in FIG. 8A, in the fourth exemplary embodiment, the inclination angle θ of the inclined face 35 formed at each projection portion 34 with respect to the floor wall 30 is altered to be greater, and the area of the inclined face 35 is made greater than in the first exemplary embodiment and the third exemplary embodiment. Thus, a portion (a rear portion) of the inner face 24C of the rear end portion 25 of the front side member 24 is exposed by the inclined face 35.

Accordingly, the portions of the end face 24A and portions of the inner face 24C of the front side member 24 that are exposed through the slit portions 32, the portions of the inner face 26A at the outer wall, upper wall, inner wall and lower wall of the cap member 26, and the inclined faces 35 of the projection portions 34 formed at the cap member 26 are joined together by arc welding, and these weld regions serve as the weld portions 36.

In this fourth exemplary embodiment, the weld area may be increased more than in the above-described first exemplary embodiment and second exemplary embodiment. Therefore, the welding strength between the front side member 24 and the cap member 26 may be improved relative to the above-described first exemplary embodiment and second exemplary embodiment.

Figure 8B:
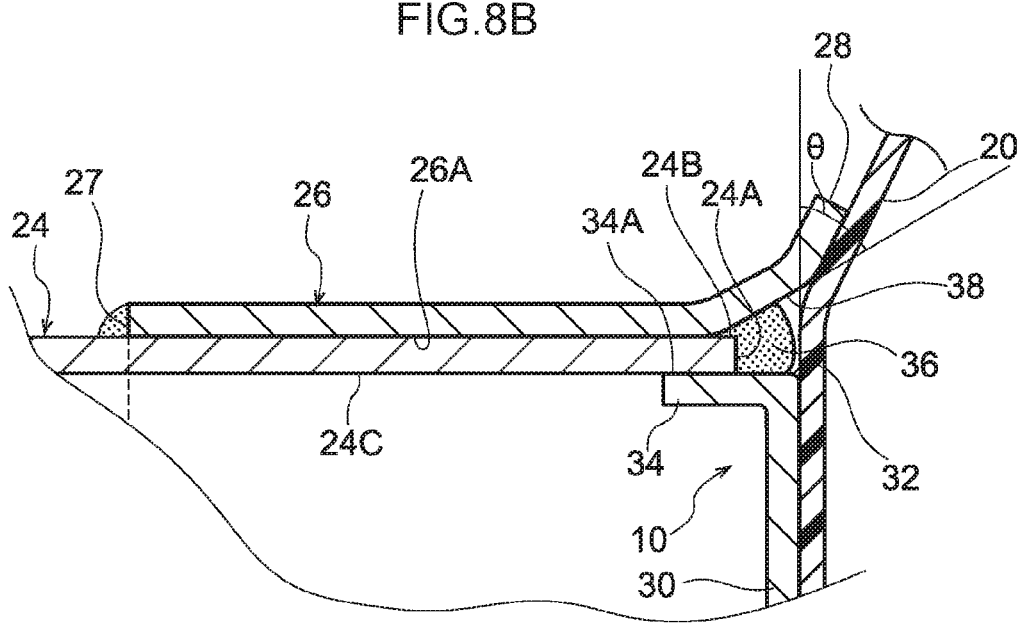
FIG. 8B is a partial magnified sectional diagram corresponding to FIG. 4, illustrating another vehicle framework reinforcement structure in accordance with the fourth exemplary embodiment.

As illustrated in FIG. 8B, the inclination angle θ of the chamfer portion 38 formed at the outer side edge portion of each slit portion 32 (at the inner face 26A of the cap member 26) opposing the projection portion 34 may be altered to be increased instead of the area of the inclined face 35 formed at the projection portion 34, and thus the area of the chamfer portion 38 may be made larger than in the second exemplary embodiment and the third exemplary embodiment. In this structure, a portion (a rear portion) of the outer face 24B of the rear end portion 25 of the front side member 24 is exposed by the chamfer portion 38.

Thus, in this structure, the portions of the end face 24A and portions of the outer face 24B of the front side member 24 that are exposed through the slit portions 32, the chamfer portions 38 formed at the inner face 26A at the outer wall, upper wall, inner wall and lower wall of the cap member 26, and the projection portions 34 (the outer faces 34A thereof) formed at the cap member 26 are joined together by arc welding, and these weld regions serve as the weld portions 36.

In this fourth exemplary embodiment too, the weld area may be increased more than in the above-described first exemplary embodiment and second exemplary embodiment. Therefore, the welding strength between the front side member 24 and the cap member 26 may be improved relative to the above-described first exemplary embodiment and second exemplary embodiment.

Although not illustrated in the drawings, both the area of the inclined face 35 formed at each projection portion 34 may be increased and the area of the chamfer portion 38 formed at the outer side edge portion of the slit portion 32 opposing the projection portion 34 may be increased. That is, a structure of a combination of the mode illustrated in FIG. 8A and the mode illustrated in FIG. 8B may be formed. In this structure, both portions of the inner face 24C and portions of the outer face 24B of the front side member 24 are exposed.

Thus, in this structure, the portions of the end face 24A, the portions of the inner face 24C and the portions of the outer face 24B of the front side member 24 that are exposed through the slit portions 32, the chamfer portions 38 formed at the inner face 26A of the cap member 26, and the inclined faces 35 of the projection portions 34 formed at the cap member 26 are joined together by arc welding, and these weld regions serve as the weld portions 36.

According to this structure, the weld area may be increased more than in the exemplary embodiment illustrated in FIG. 8A and FIG. 8B. Therefore, the welding strength between the front side member 24 and the cap member 26 may be improved relative to the exemplary embodiment illustrated in FIG. 8A and FIG. 8B.

Hereabove, the vehicle framework reinforcement structure 10 according to the present exemplary embodiments has been described on the basis of the attached drawings. However, the vehicle framework reinforcement structure 10 according to the present exemplary embodiments is not limited to the illustrated structures; suitable design modifications may be applied within a scope not departing from the gist of the present disclosure. For example, a lightweight metal material is not limited to an aluminum alloy.

In the vehicle framework reinforcement structure 10 according to the first exemplary embodiment, a structure is possible in which the inclined face 35 is not formed at each projection portion 34. Moreover, neither of the inclination angle θ of the inclined face 35 of the projection portion 34 with respect to the floor wall 30 and the inclination angle θ of the chamfer portion 38 is limited to 45°.

The front side members 24 are not limited to structures with a constant cross section that are formed by extrusion molding of a lightweight metal material. For example, each front side member 24 may be structured by joining together an outer panel and an inner panel, which are not illustrated in the drawings, and forming the same into a closed cross section shape. Moreover, the cap members 26 are not limited to structures that are formed by die-casting.

The vehicle framework reinforcement structure 10 according to the present exemplary embodiments is not limited to a structure that is employed at the front side members 24 but may be employed at, for example, the upper members 14. The vehicle framework reinforcement structure 10 according to the present exemplary embodiments may also be employed at cross-members disposed at a floor lower portion (not illustrated in the drawings), rockers disposed at floor side portions (not illustrated in the drawings) and the like.

What is claimed is:

1. A vehicle framework reinforcement structure, comprising:
   a joining member in a tubular shape with a bottom that is mounted to a vehicle main body, the joining member including a floor wall that includes a plurality of slit portions;
   a vehicle framework member that is inserted into the joining member, an outer wall face of the vehicle framework member being welded to an opening end portion of the joining member, and the vehicle framework member being configured such that portions of an end face thereof are exposed through the plurality of slit portions;
   a plurality of projection portions formed along the plurality of slit portions, the projection portions contacting an inner wall face of the vehicle framework member; and
   a plurality of weld portions, the portions of the end face of the vehicle framework member that are exposed through the slit portions being welded to the joining member at the weld portions, and the weld portions including welding of the projection portions.

2. The vehicle framework reinforcement structure according to claim 1, wherein the projection portions include inclined faces that are angled toward outer sides from the floor wall, and the weld portions include welding of the inclined faces.

3. The vehicle framework reinforcement structure according to claim 2, wherein the weld portions include welding of the inner wall face of the vehicle framework member.

4. The vehicle framework reinforcement structure according to claim 1, wherein edge portions of the slit portions that oppose the projection portions include chamfer portions, and the weld portions include welding of the chamfer portions.

5. The vehicle framework reinforcement structure according to claim 4, wherein the weld portions include welding of the outer wall face of the vehicle framework member.

6. The vehicle framework reinforcement structure according to claim 1, wherein the vehicle framework member is formed in a rectangular shape in cross section, and the plurality of slit portions expose the end face at least at corner portions of the vehicle framework member.

7. The vehicle framework reinforcement structure according to claim 2, wherein an inclination angle of the inclined faces with respect to the floor wall is at least 45°.

8. The vehicle framework reinforcement structure according to claim 4, wherein an inclination angle of the chamfer portions with respect to the floor wall is at least 45°.

* * * * *